(12) United States Patent
Burger et al.

(10) Patent No.: US 6,586,855 B2
(45) Date of Patent: Jul. 1, 2003

(54) UNIVERSAL ELECTRIC MOTOR FOR HAND-HELD TOOL DEVICES

(75) Inventors: Helmut Burger, Moorenweis (DE); Hermann Schuster, Geltendorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/935,984

(22) Filed: Aug. 23, 2001

(65) Prior Publication Data

US 2002/0180287 A1 Dec. 5, 2002

(30) Foreign Application Priority Data

Aug. 24, 2000 (DE) .......................... 100 41 631

(51) Int. Cl.[7] .................................... H02K 5/00

(52) U.S. Cl. ..................... 310/88; 310/233; 310/239

(58) Field of Search ................. 310/239, 242, 310/245, 247, 52, 58, 85, 86, 88, 50

(56) References Cited

U.S. PATENT DOCUMENTS

| | | | | | |
|---|---|---|---|---|---|
| 3,813,567 | A | * | 5/1974 | Schmuck | 310/239 |
| 3,919,574 | A | * | 11/1975 | Schmuck | 310/88 |
| 4,311,935 | A | * | 1/1982 | Hoyss | 310/227 |
| 4,499,390 | A | * | 2/1985 | Iwaki et al. | 310/88 |
| 4,626,720 | A | * | 12/1986 | Fukasaku et al. | 310/88 |
| 5,864,194 | A | * | 1/1999 | Okamoto et al. | 310/239 |
| 6,417,595 | B1 | * | 7/2002 | Wasson | 310/220 |

FOREIGN PATENT DOCUMENTS

JP         402185670    *   7/1990

* cited by examiner

*Primary Examiner*—Tran Nguyen
(74) *Attorney, Agent, or Firm*—Sidley Austin Brown & Wood, LLP

(57) ABSTRACT

A universal electric motor (1) for driving an electric hand-held tool device which experiences a high dust load, has a commutator (2), with carbon brushes (9) and lamellas (4). The motor has, for protection against dust particles carried along in the cooling air flowing through it, a protective shield (3) of a stiff and thermally conductive material.

9 Claims, 1 Drawing Sheet

UNIVERSAL ELECTRIC MOTOR FOR HAND-HELD TOOL DEVICES

FIELD OF INVENTION

The invention relates to an electric motor with a commutator, preferably a universal electric motor, which is operated in series and ventilated by air flow, with a high power density, especially as a driving mechanism for electric hand-held tool devices which experience a high dust load, such as grinding implements, hammer drills, and the like.

BACKGROUND INFORMATION AND PRIOR ART

Such electric motors consist of a rotor, which rotates about an axis of rotation and is constructed as an armature, with an armature winding, through which current flows, and a commutator, which switches over the terminal bases of the armature windings during the rotation of the rotor and includes the rotor and carbon brushes of the stator.

In the case of universal electric motors which, because of their high power density, are ventilated by air flow to dissipate the excitation heat, dust particles, carried along in the flow of cooling air, on the one hand, because of the high relative movement, leads to a roughening of the surface of the lamellas due to wear by blast air and, on the other, due to direct penetration between the lamellas and the carbon brushes, increases abrasive wear of the carbon brushes, which generally limits the lifetime of the commutator and, with that, of the electric motor or of the electric hand-held tool device.

According to U.S. Pat. No. 6,025,662, an electric hand-held tool device with an electric motor, ventilated by a flow of air, has a commutator, with a protective shield having two protective coverings, which are assigned to the carbon brushes and deflect the cooling air stream directly in front of the carbon brushes. The remaining lamellas continue to be exposed to the dust particles, which are carried along in the flow of cooling air.

The U.S. Pat. No. 4,311,935 describes a protective shield of a nonconductive material, which encloses an acute-angled sector of the commutator and is disposed, in the direction of rotation, ahead of the carbon brushes. The remaining lamellas continue to be exposed to the dust particles, which are carried along in the flow of cooling air.

According to U.S. Pat. No. 3,919,574, the commutator is encapsulated completely by a protective shield of a non-conducting material, such as a plastic. The protective shield peripherally surrounds the carbon brushes and, over a narrow, radial air gap, the lamellas. It is a disadvantage that the cooling of the commutator is reduced significantly because the protective shield consists of a plastic.

OBJECT OF THE INVENTION

It is an object of the invention to provide a shield, which offers complete protection for the commutator of a universal electric motor, ventilated by air flow, against dust particles, which are carried along in the stream of cooling air, and enables the commutator to be adequately cooled.

SUMMARY OF THE INVENTION

Essentially, in the case of a universal electric motor, ventilated by air flow, the commutator is enclosed by a peripherally closed protective shield of a stiff and thermally conductive material, which surrounds with its internal casing radius at least the axial contact region, which is in frictional contact with the carbon brushes, and forms an insulating, radial air gap.

Due to the rotation of the lamellas about the axis of the rotor, a rotating air stream results within the annular air gap and brings about good thermal convection within the air gap as well as slight resistance to transfer of heat between the lamellas and air or air and the protective shield.

The stiff protective shield preferably consists of a thin sheet of metal, such as aluminum, and therefore has good thermal conductivity.

The surface of the protective shield advantageously is microscopically smooth on both sides. As a result, the resistance to the transfer of heat to the air is slight and there is little tendency for the dust particles to adhere.

Furthermore, the surface of the protective shield advantageously is dull and blackened, as a result of which good heat radiation is ensured.

Advantageously, the metal sheet has a profiled and preferably is folded in undulating fashion, as a result of which a high bending stiffness, as well as a larger surface area in relation to the internal radius of the casing, results.

The surface of the undulating, folded metal sheet advantageously proceeds helically about the axis of the rotor, as a result of which, due to the rotation of the lamellas, an air stream is formed along the individual surface perpendicularly to the lamellas. Over the axial fold openings, present on either side, this air stream enables air to be exchanged within the fold openings.

Advantageously, the lamellas additionally form an axially adjoining cooling region, which is not in frictional contact with the carbon brushes and within which the lamellas furthermore advantageously have small radial wing stubs, which contribute a better air circulation and add partially to the cooling of the lamellas.

BRIEF DESCRIPTION OF THE DRAWINGS

The invention is described in greater detail with respect to an advantageous example. In the drawing.

DETAIL DESCRIPTION OF THE INVENTION

Figure 1:
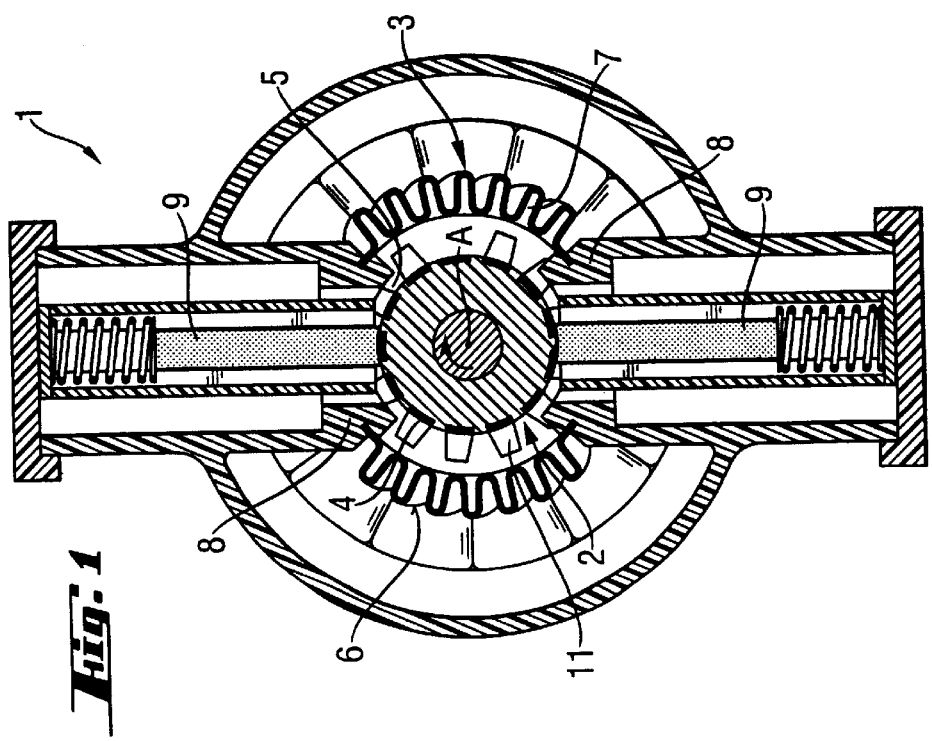
FIG. 1 is a cross sectional view of a universal electric motor with a commutator embodying the invention.

According to FIG. 1, a universal electric motor 1, which is ventilated by a flow of air, has a commutator 2 shown in cross section, with a peripherally closed protective shield 3, which encases the lamellas 4, which are disposed on the rotor, and are rotated about an axis A, the shield is formed of a stiff and heat-conductive material. With an internal casing radius, the protective shield 3 forms an insulating, radial air gap 5 and is formed from an undulating, folded metal sheet, the surface 6 of which passes helically about the rotor axis A with undulating fold openings 7 being formed at both inner and outer sides. The region, remaining between the holding devices 8 for the carbon brushes 9, is completely closed peripherally by the protective shield 3.

Figure 2:
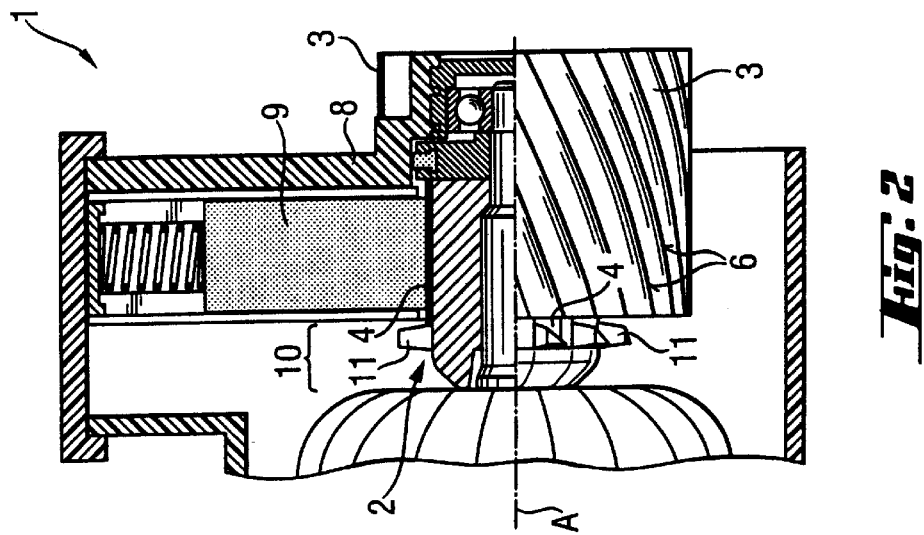
FIG. 2 shows a partial longitudinal section through a universal electric motor with commutator.

According to FIG. 2, a partial longitudinal section along the axis A is shown in the upper portion of the Figure in the plane of the carbon brush holding device 8 and in the lower partial longitudinal section in a direction perpendicularly thereto. The protective shield 3 surrounds the axial contact region of the lamellas 4, which is in frictional contact with the carbon brushes 9. The lamellas 4 form a cooling region 10, which axially adjoins but is not in frictional contact with the carbon brushes 9 and within which the lamellas 4 have small radial wing stubs 11.

What is claimed is:

1. A universal electric motor for driving an electrical hand-held tool device which experiences a high dust load, comprising a commutator (2) rotatable about an axis (A), said commutator comprises a rotor with lamellas located on said rotor, carbon brushes (9) arranged to be contacted by said lamellas, an axially extending peripherally closed protective shield (3) for protecting the rotor and carbon brushes against dust particles carried along in an air stream which ventilates and cools the rotor and carbon brushes, said protective shield (3) encloses said rotor and carbon brushes and has an inner casing surface radially spaced outwardly from said lamellas and defining a radial air gap (5) enclosing said lamellas, wherein said air gap is located at a region where said lamellas at least in fractional contact with said carbon brushes (9), and said protective shield formed of stiff and thermally conductive material, and said lamellas in the contact region with said carbon brushes form an axially adjoining cooling region wherein said adjoining cooling region is not in contact with the carbon brushes (9).

2. A universal electric motor, as set forth in claim 1, wherein said protective shield has a radially inner surface and a radically outer surface formed microscopically smooth on both said inner and outer surfaces.

3. A universal electric motor, as set forth in claim 2, wherein said inner and outer surfaces of said protective shield (3) are dull and blackened.

4. A universal electric motor, as set forth in claim 3, wherein the stiff and thermally conductive material comprises a thin metal sheet.

5. A universal electric motor, as set forth in claim 4, wherein said metal sheet has a curved contour.

6. A universal electric motor, as set forth in claim 5, wherein said metal sheet in the direction of the axis (A) is folded alternately inwardly and outwardly whereby the inner and outer surfaces thereof have a undulating configuration.

7. A universal electric motor, as set forth in claim 6, wherein the axially extending metal sheet is arranged helically about the axis (A).

8. A universal electric motor, as set forth in claim 6, wherein the undulating configuration of said metal sheet forms trough-shaped members in the inner and outer surfaces extending generally in the direction of the axis (A).

9. A universal electric motor, as set forth in claim 1, wherein said lamellas (4) have small wing stubs (11) extending outwardly from said lamellas within said cooling region (10).

* * * * *